United States Patent
Hada (10) Patent No.: US 8,654,243 B2
(45) Date of Patent: *Feb. 18, 2014

(54) IMAGE PICKUP APPARATUS AND CONTROL METHOD THEREOF

(71) Applicant: Canon Kabushiki Kaisha, Tokyo (JP)

(72) Inventor: Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,270

(22) Filed: Oct. 18, 2012

(65) Prior Publication Data

US 2013/0100319 A1    Apr. 25, 2013

Related U.S. Application Data

(63) Continuation of application No. 12/778,804, filed on May 12, 2010, now Pat. No. 8,319,883.

(30) Foreign Application Priority Data

May 15, 2009 (JP) .................................. 2009-119319

(51) Int. Cl.
 *G03B 13/00* (2006.01)
 *H04N 5/232* (2006.01)
 *H04N 5/262* (2006.01)
 *H04N 5/222* (2006.01)

(52) U.S. Cl.
 USPC .................. 348/346; 348/239; 348/333.12

(58) Field of Classification Search
 USPC ................. 348/240.2, 239, 333.01–333.03, 348/333.11, 333.12, 346
 See application file for complete search history.

(56) References Cited

U.S. PATENT DOCUMENTS

| | | | | |
|---|---|---|---|---|
| 7,230,648 | B2 * | 6/2007 | Ueno | 348/340 |
| 7,492,406 | B2 * | 2/2009 | Park et al. | 348/333.05 |
| 8,068,162 | B2 * | 11/2011 | Fredlund et al. | 348/333.11 |
| 8,144,234 | B2 * | 3/2012 | Morita | 348/345 |
| 8,319,883 | B2 * | 11/2012 | Hada | 348/346 |
| 2009/0185064 | A1 * | 7/2009 | Maniwa | 348/333.11 |
| 2010/0013977 | A1 * | 1/2010 | Suzuki | 348/333.11 |

FOREIGN PATENT DOCUMENTS

JP    2006222979 A  *  8/2006
WO  WO 2008072374 A1  *  6/2008

OTHER PUBLICATIONS

Machine Translation of JP 2006-222979 A to Nakamura published Aug. 2006.*

* cited by examiner

*Primary Examiner* — Daniel M Pasiewicz
(74) *Attorney, Agent, or Firm* — Canon USA, Inc. IP Division (57) ABSTRACT

An apparatus includes a display unit configured to display a captured image, an object region detection unit configured to detect the main object region in a photographic screen, a determination unit configured to determine whether the main object region is in a focused state, an enlarge unit configured to enlarge and display the main object region in focus on the display unit larger than when the main object region is not in focus, an object movement detection unit configured to detect whether the main object in the main object region moves in the photographic screen, and an enlarge control unit configured to, when the object movement detection unit detects that the main object is moving, limit the enlarge from performing enlargement and display.

20 Claims, 7 Drawing Sheets

DISPLAY EXAMPLE WHEN IN-FOCUS REGION IS OVERLAPPED ON OTHER IN-FOCUS REGION

IMAGE PICKUP APPARATUS AND CONTROL METHOD THEREOF

CROSS-REFERENCE TO RELATED APPLICATIONS

This application is a continuation of application Ser. No. 12/778,804, filed on May 12, 2010, claims priority from Japanese Patent Application No. 2009-119319 filed May 15, 2009, which is hereby incorporated by reference herein in its entirety.

BACKGROUND OF THE INVENTION

1. Field of the Invention

The present invention relates to an image pickup apparatus and a control method thereof that enable a display unit to enlarge and display a main object.

2. Description of the Related Art

When a user focuses a digital camera for image capturing (photographing), it has been difficult to check whether the digital camera is correctly focused since a photographic screen provided on the digital camera does not have a sufficient size. Therefore, when an image is enlarged and displayed or printed after being captured, the image may not be correctly in focus state.

In recent years, thus, in order to correctly perform focusing for photographing, a technique has been discussed in which a focus position is enlarged and displayed so that a user can perform focusing easily and accurately.

Japanese Patent application Laid-Open No. 2003-179798 discusses a technique in which, when a user half presses a shutter button, a region around a center of a focus area previously set by the user is enlarged and displayed. Further, the user can operate the camera to freely change a position of a photographing target object, whose image is displayed in an enlarge-display area, in an entire object area, and a resolution of the image displayed thereat.

Further, some digital cameras provided with a moving object tracking function have a function for displaying a focus region frame after the camera is focused on an object, and for tracking and displaying the focus region frame according to a movement of the object even when the object is moving.

However, in order to enlarge the focus position as described in Japanese Patent application Laid-Open No. 2003-179798, the user has to previously set the focus position on the photographic screen before photographing.

Further, there may be a situation that a composition of the photographic screen is difficult to grasp when enlargement and display are performed under an unstable condition where the object is moving, or non of in-focus regions (focused regions) can be enlarged and displayed when the object is located at a corner of the photographic screen.

SUMMARY OF THE INVENTION

According to an aspect of the present invention, an apparatus includes a display unit configured to display a captured image, an object region detection unit configured to detect an object region inside a photographic screen, an in-focus determination unit configured to determine whether a main object region is in focus, an enlarge and display unit configured to enlarge and display the main object region in focus on the display unit more largely than when the main object region is not in focus, a movement detection unit configured to detect whether the object in the object region moves inside the photographic screen, and a control unit configured to, when the object is moving, limit the enlarge and display unit from performing enlargement and display.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Elements of one embodiment may be implemented by hardware, firmware, software, or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, and micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

Various exemplary embodiments, features, and aspects of the invention will be described in detail below with reference to the drawings.

Figure 1:
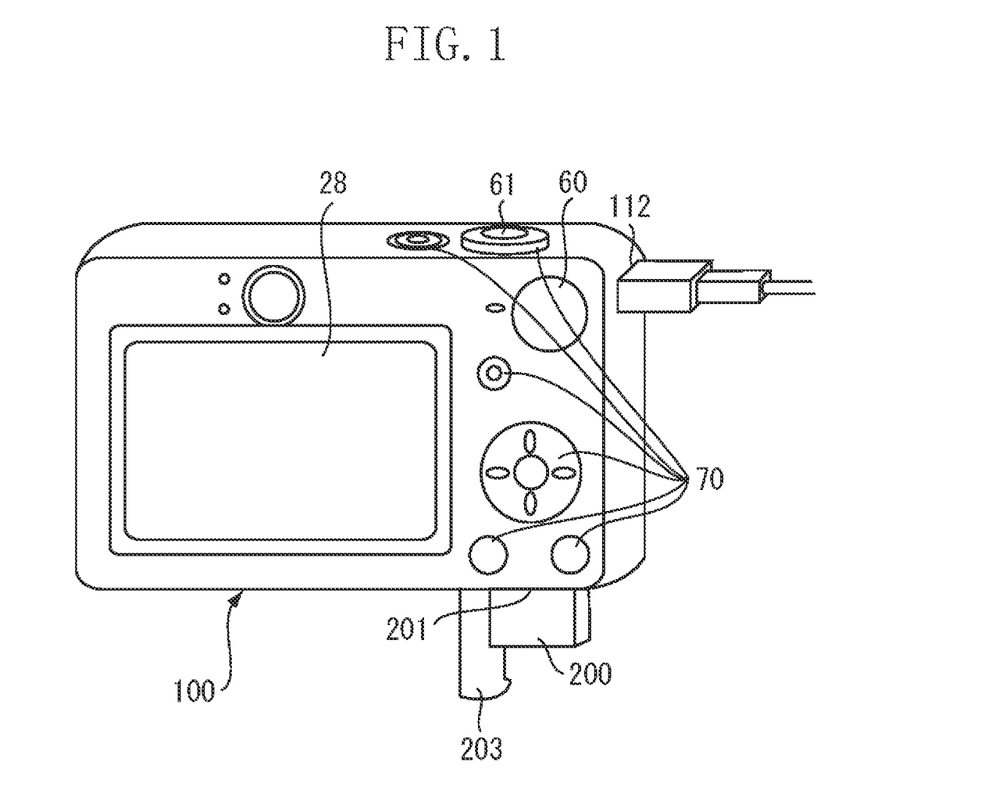
FIG. 1 illustrates an external appearance of a digital camera according to a first exemplary embodiment of the present invention.

FIG. 1 illustrates an external appearance of a digital camera as an example of an image pickup apparatus according to a first exemplary embodiment of the present invention.

In FIG. 1, an image display unit 28 displays images or various types of information. A mode dial 60 switches various types of modes, a shutter button 61 instructs photographing preparation operations and photographing operations. Operation units 70 include various types of switches, buttons, and touch panels that receive various types of operations from a user. A digital camera 100 serves as an image pickup apparatus, and a connector 112 is connected with a digital camera 100 via a connection cable.

Further, FIG. 1 illustrates a storage medium 200 such as a memory card and a hard disk. A storage medium 200 can be inserted into a storage medium slot 201, and the inserted storage medium 200 can communicate with the digital camera 100. A cover 203 covers the storage medium slot 201.

Figure 2:
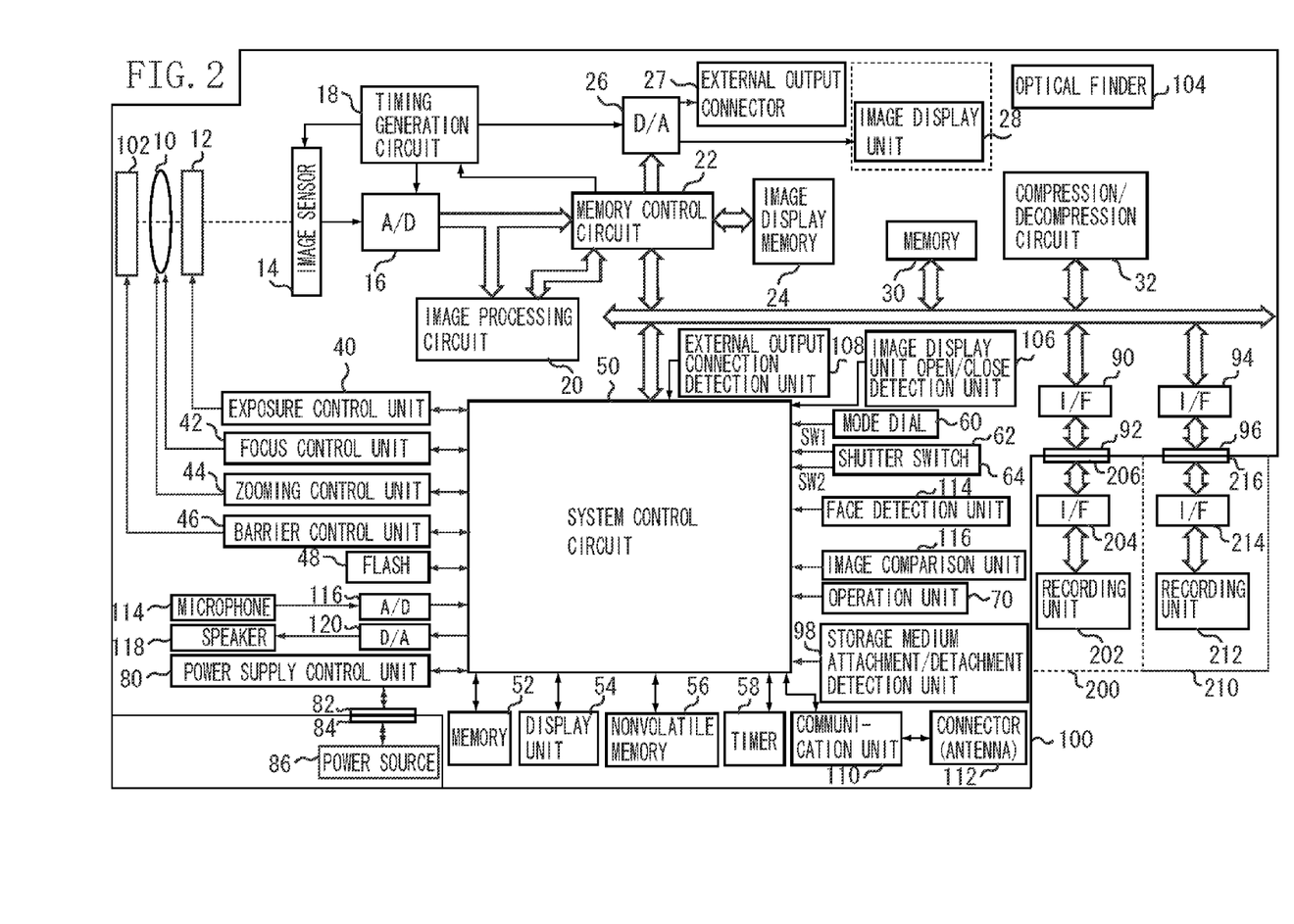
FIG. 2 is a block diagram illustrating a configuration of the digital camera according to the first exemplary embodiment.

FIG. 2 is a block diagram illustrating a configuration of the digital camera 100 according to the first exemplary embodiment of the present invention. The same reference numerals are given to the same components illustrated in FIG. 1.

FIG. 2 illustrates the digital camera 100. The digital camera 100 includes an imaging lens 10, a shutter 12 having a diaphragm function, an image sensor 14, and an analog/digital (A/D) converter 16. A timing generation circuit 18 supplies a clock signal or a control signal to the image sensor 14, the A/D converter 16, and a digital/analog (D/A) converter 26, and is controlled by a memory control circuit 22 and a system control circuit 50 described below.

An image processing circuit 20 performs predetermined pixel interpolation processing and color conversion processing on data from the A/D converter 16 or the memory control circuit 22. The image processing circuit 20 performs predetermined calculation processing using captured image data. Based on the acquired calculation result, the system control circuit 50 performs auto focus (AF) processing, auto exposure (AE) processing, and pre-flash emission processing.

The memory control circuit 22 controls the A/D converter 16, the timing generation circuit 18, the image processing circuit 20, an image display memory 24, the D/A converter 26, a memory 30, and a compression/decompression circuit 32. The data from A/D converter 16 is written into the image display memory 24 via the image processing circuit 20 and the memory control circuit 22, or the data from the A/D converter 16 is written into the memory control circuit 22 directly via the memory control circuit 22. Similarly, the data is written into the memory 30 described below.

An external output connector 27 outputs an output from the D/A converter 26 onto an external monitor. When a connector is inserted into the external output connector 27, the system control circuit 50 can know a state of an external output by an external output connection detection unit 108.

An image display unit 28 includes a thin-film transistor liquid crystal display (TFT LCD) for displaying image data to be displayed that is written into the image display memory 24 via the D/A converter 26. The captured image data is sequentially displayed using the image display unit 28 to realize an electronic finder function.

The image display unit 28 can freely turn on/off a display according to an instruction of the system control circuit 50. When the display is turned off, a power consumption of the digital camera 100 can be greatly decreased. Further, the image display unit 28 is connected to a main body of the digital camera 100 by a rotatable hinge part to freely set a direction and an angle so that the user can use an electronic finder function, a replay display function, and various types of display functions.

Furthermore, a display part of the image display unit 28 can be retracted (closed) on the digital camera 100. In this case, the image display unit open/close detection unit 106 detects a closed state to stop a display operation by the image display unit 28.

A memory 30 stores a still image or a moving image. The memory 30 can be also used as a working area of the system control circuit 50. Further, the memory 30 can be used as a writing buffer of storage media 200 and 210.

A compression/decompression circuit 32 compresses/decompresses image data by the adaptive discrete cosine transform (ADCT). The compression/decompression circuit 32 reads image data stored in the memory 30 to perform compression/decompression processing, and then writes the processed data into the memory 30.

An exposure control unit 40 controls the shutter 12 having a diaphragm function. A focus control unit 42 controls focusing the imaging lens 10, a zooming control unit 44 controls zooming of the imaging lens 10, and a barrier control unit 46 controls movements of a protection member 102 that are barriers. A flash 48 has functions for projecting auto-focus (AF) auxiliary light and controlling an amount of flash light.

The system control circuit 50 controls the entire digital camera 100 and executes a program stored in a non-volatile memory 56 to realize processing described below. A memory 52 develops a constant, a variable, and a program read from the non-volatile memory 56 for operating the system control circuit 50.

A display unit 54 includes a liquid crystal display apparatus and a speaker, which display an operation state and a message using characters, images and audio according to an execution of the program performed by the system control circuit 50.

A display 54 is disposed at one or multiple places where the display 54 can be easily viewed, near an operation unit of the digital camera 100. The display unit 54 is constituted by, for example, a combination of a liquid crystal display (LCD), a light emitting diode (LED), and a sound production element. Further, part of functions of the display unit 54 are disposed in an optical finder 104.

The non-volatile memory 56 can electrically store and erase data. For example, an electrically erasable programmable ROM (EEPROM) is used. The non-volatile memory 56 stores constants and programs for operating the system control circuit 50. The program described in the present exemplary embodiment executes various flowcharts in the exemplary embodiments described below. A timer 58 is used to measure a speed of storing data by a storage medium 200 or 210, and a data rate of obtained data.

A mode dial 60, a switch (SW1) 62, a switch (SW2) 64, and operation units 70 are operation units for inputting various operation instructions to the system control circuit 50. The operation units 70 include one of or multiple combinations of a switch, a dial, a touch panel, a pointing by detecting a visual line, and an audio recognition apparatus.

A part of the operation units 70 are illustrated in FIG. 1. When a button is used as the operation unit 70, a display is changed to a menu screen by pressing the button, and a cursor is moved to change the display to an in-focus region enlarge and display mode selection screen using a cross key. Further pressing the button makes a determination to enter an in-focus region enlarge and display mode.

A power source 86 is a power source including various primary batteries, second batteries, or an alternate current (AC) adaptor. The power is supplied from the power source 86 to a control unit 80 via connectors 82 and 84.

The digital camera 100 includes interfaces 90 and 94 that connect the digital camera 100 to the storage media such as a memory card and a hard disk via connectors 92 and 96. A storage medium attachment/detachment detection unit 98 detects whether the storage medium 200 or 210 is mounted to the connector 92 or 96.

A protection member 102 is a barrier for covering an imaging unit including the lens 10 of the digital camera 100 to protect the imaging unit from dusts and damages. An optical finder 104 enables the user to photograph only using the optical finder 104 without using an electronic view finder function by the image display unit 28.

An image display unit open/close detection unit 106 detects whether the image display unit 28 is closed with the display part thereof being faced to the digital camera 100.

An external output connection detection unit 108 detects whether an external monitor is connected to the connector 27. When it is determined that the external monitor is connected to the connector 27, the external monitor can be used as the display apparatus instead of the image display unit 28.

A communication unit 110 includes various communication functions such as a recommended standard 232C (RS232C), a universal serial bus (USB), institute of electrical and electronics engineers (IEEE) 1394, P1284, a small computer system interface (SCSI), a modem, a local area network (LAN), and a wireless communication. A connector 112, or an antenna for the wireless communication, connects the digital camera 100 to other devices via the communication unit 110.

A face detection unit 114 analyzes image data processed by the image processing circuit 20 and image data stored in the image display memory 24 to detect a region including a possible face in the image data. When the region including the possible face is detected, a certainty of the possible human's face, a position thereof in the input image data, and a size thereof are output. Further, a feature quantity of each feature point of the detected face can be output.

An image comparison unit 116 performs image pattern matching based on color information on two images stored in the image display memory 24 and the memory 30 to detect difference between the images. A speaker 118 is an audio data replay unit. A digital/analog (D/A) converter 120 for D/A converting digital audio data output from the system control circuit 50 to replay thereof by the speaker 118.

The face detection unit 114 and the image comparison unit 116 is used to track a main object. Coordinates and an area of the image of the face detected by the face detection unit 114 are input into the image comparison unit 116. After a predetermined time has elapsed, a search is performed using face information input into the image data stored in the image display memory 24, and an amount of movement of the face is acquired to track the face.

Storage media 200 and 210 are, for example, a memory card or a hard disk. The storage media 200 and 210 are provided with storage units 202 and 212 respectively that include a semiconductor memory or a magnetic disk, interfaces 204 and 214 between the digital camera 100 and the storage media 200 and 210, and connectors 206 and 216 connecting the digital camera 100 to the storage media 200 and 210.

Figure 4A:
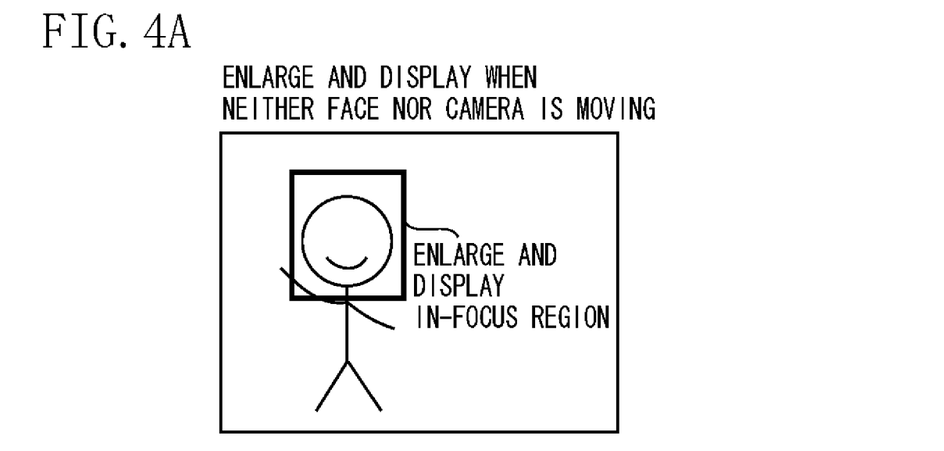
FIG. 4A to FIG. 4C illustrate display examples according to the first exemplary embodiment.
Figure 4B:
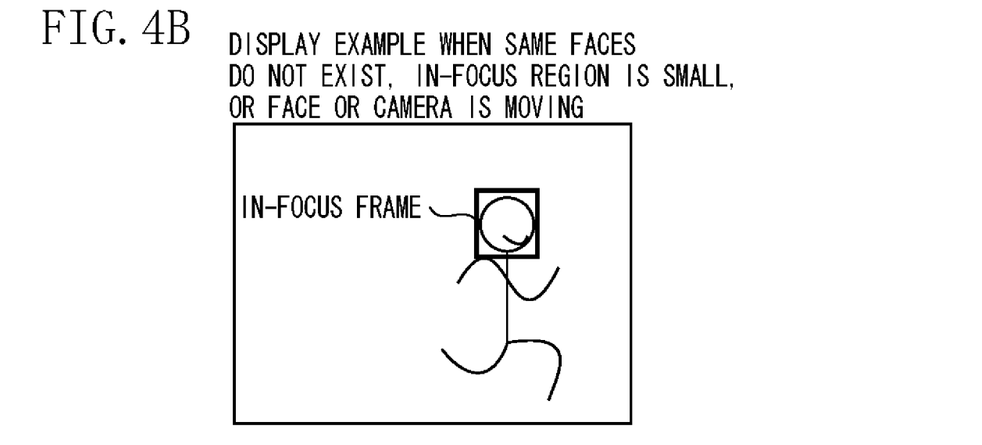
Figure 4C:
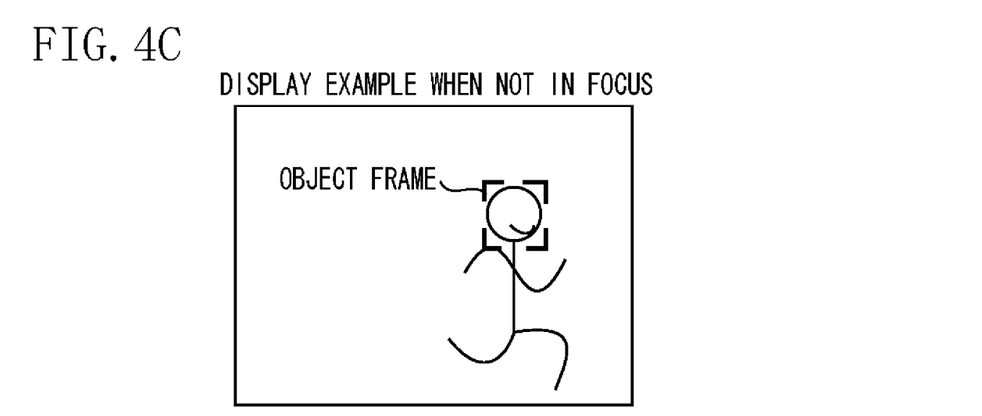

The operation unit 70 is operated to change a mode to an "in-focus region enlarge and display mode", and further to a mode where the in-focus region is enlarged and displayed as illustrated in FIG. 4 described below according to settings. The "in-focus region enlarge and display mode" refers to a mode in which AF is performed while a switch SW1 is turned on, and the in-focus (correctly focused) region is enlarged and displayed on the image display unit 28.

With reference to a flowchart illustrated in FIG. 3, main operations according to the first exemplary embodiment of the present invention will be described. Firstly, in the processing, when a face is defined to be a main object, a size of the main object, whether the main object or the camera are moving, and whether the main object is in focus are determined. According to the result of the determinations, enlargement and display of the in-focus region of the main object in the image display unit 28 is automatically switched.

The system control circuit 50 expands in the memory 52 the program stored in the non-volatile memory 56, and executes the program to realize each processing for enlarging and displaying the in-focus region of the main object. When the main object or the camera is moving, the enlargement and display is not performed on the in-focus region.

Further, switching the enlargement and display of the in-focus region includes a case where the in-focus region is enlarged and displayed, a case where the in-focus frame is displayed without enlarging and displaying the in-focus region, and a case where an object frame is displayed since the object is not in focus.

Figure 3:
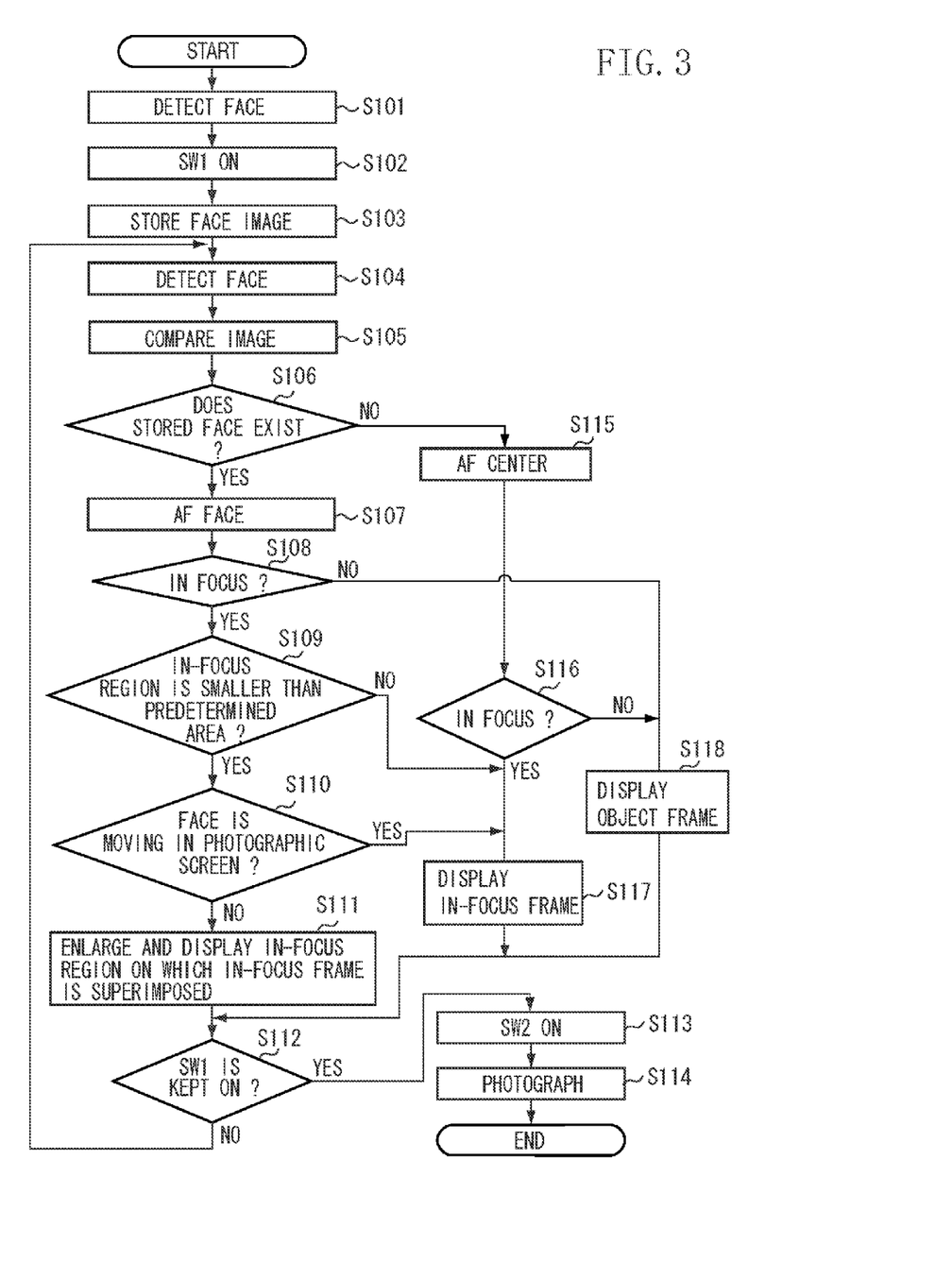
FIG. 3 is a flowchart illustrating main operations according to the first exemplary embodiment.

Referring to FIG. 3, in step S101, the system control circuit 50 detects a face using the face detection unit 114 and determines the face to be a main object inside the photographic screen. The face to be the main object may be determined by a size or a certainty thereof, or the user may freely determine using the operation unit 70.

In step S102, the system control circuit 50 waits for the switch SW1 to be turned on. When the switch SW1 is turned on, the processing proceeds to step S103 to start enlarge and display processing on the in-focus region of the main object.

In step S103, the system control circuit 50 stores image information including a position and a size of the face to be the main object, which is detected in step S101, in the photographic screen. In step S104, the detection operation similar to that in step S101 is performed.

In step S105, the image comparison unit 116 compares the information of the image of the face to be the main object stored in the step S103 with the face information of the image detected in step S104. In step S106, it is determined whether two faces are the same (or whether the stored face exists). When it is determined that the two faces are the same (YES in step S106), the processing proceeds to step S107. When it is determined that the two faces are not the same (or no face exists) (NO in step S106), the processing proceeds to step S115.

As a result of comparison between the information of the image of the face to be the main object stored in step S103 and the face information of the image detected in step S104, the processing proceeds to step S107 since the faces are the same. In step S107, the system control circuit 50 performs the AF on the face detected in step S104.

In step S108, it is determined whether the main object is in focus by the AF performed in step S107. When it is determined that the main object is in focus (YES in step S108), the processing proceeds to step S109. When it is determined that the main object is not in focus (NO in step S108), the processing proceeds to step S118.

When the main object is in focus, the processing proceeds to step S109. In step S109, the system control circuit 50 determines whether an area of the in-focus region that is the main object region in focus when the AF is performed in step S107 is larger than a predetermined area value, which is a threshold value for determining whether the main object is enlarged and displayed. When it is determined that the area of the in-focus region is smaller (YES in step S109), the processing proceeds to step S110. When it is determined that the area of the in-focus region is larger (NO in step S109), the processing proceeds to step S117.

When the area of the in-focus region is smaller, the processing proceeds to step S110. In step S110, the system control circuit 50 determines whether the face of the main object stored in step S103 is moving. The movement of the face is detected by comparing the position of the face in the photographic screen stored in step S103 with the position of the face output in step S104. When it is determined that the face is not moving (NO in step S110), the processing proceeds to step S111. When it is determined that the face is moving (YES in step S110), the processing proceeds to step S117.

When the face and the camera is not moving, the processing proceeds to step S111. In step S111, the system control circuit 50 enlarges and displays the in-focus region obtained in step S107 together with a frame display as illustrated in FIG. 4A. At this point, a center of the in-focus region that is enlarged and displayed is displayed to have the same coordinates on the photographic screen as a center of the in-focus region before being enlarged.

In step S112, the system control circuit 50 determines whether the switch SW1 that has been turned on in step S102 is kept on. When it is determined that the switch SW1 is kept on (YES in step S112), the processing proceeds to step S113.

When it is determined that the switch SW1 is turned off (NO in step S112), the processing returns to step S104. The switch SW1 performs the same processing described above using the face information stored in step S103 when the switch SW1 is kept on. In step S113, the system control circuit 50 waits for the switch SW2 to be turned on. When the switch SW2 is turned on, the processing proceeds to step S114 and performs photograph processing.

As a result of comparison between the information of the image of the face to be the main object stored in step S103 and the information of the image of the face detected in step S104, since the faces are not the same (NO in step S106), the processing proceeds to step S115. In step S115, the system control circuit 50 performs the AF at one point of the center of the photographic screen. In step S116, it is determined whether the object is in focus by the AF performed in step S115.

When it is determined that the object is in focus (YES in step S116), the processing proceeds to step S117 to provide the in-focus region with the frame, which is the in-focus frame, as illustrated FIG. 4B, and display thereof. When it is determined in step S109 that the area of the in-focus region is larger than the predetermined area value (NO in step S109), and when it is determined in step S110 that either one of the face or the camera is moving (YES in step S110), the processing also proceeds to step S117 to provide the in-focus region with the in-focus frame as illustrated FIG. 4B and display the in-focus region with the in-focus frame.

On the other hand, when it is determined in step S108 or S116 that the object is not in focus (NO in step S108, or S116), the processing proceeds to step S118 to provide the main object with the frame, which is the object frame, as illustrated in FIG. 4C, and display thereof. The frame displayed in step S118 has a display form different from the frame displayed in step S117.

According to the first exemplary embodiment, when the main object and the camera stay still and further the main object is in focus (YES in step S108 and NO in step S110), in step S111, the in-focus region where the main object is in focus is enlarged and displayed as illustrated in FIG. 4A. Therefore, the user can easily check whether the object is in focus without setting a focus position in advance.

When the main object or the camera is moving (YES in step S110) or the main object is not in focus (NO in step S108), in step S117, the in-focus frame is displayed as illustrated in FIG. 4B, or in step S118, the object frame is displayed as illustrated in FIG. 4C, without enlarging and displaying the object. Thus, photograph failures caused by object movement, hand shaking, or out of focus can be prevented in advance.

Main Operation according to a second exemplary embodiment of the present invention will be described with reference to a flowchart illustrated in FIG. 5. A configuration of the camera is similar to that illustrated in FIG. 1 and in FIG. 2.

According to the second exemplary embodiment, when the face is defined as the main object, the position of the in-focus region of the main object, the size thereof, and whether a plurality of the in-focus regions of the objects are overlapped with each other are determined. According to the result of the determination, processing for automatically changing the position where the in-focus region of the main object is enlarged and displayed on the image display unit 28 is performed.

The system control circuit 50 expands in the memory 52 the program stored in the non-volatile memory 56, and executes the program to realize each processing for enlarging and displaying the in-focus region of the main object.

Figure 5:
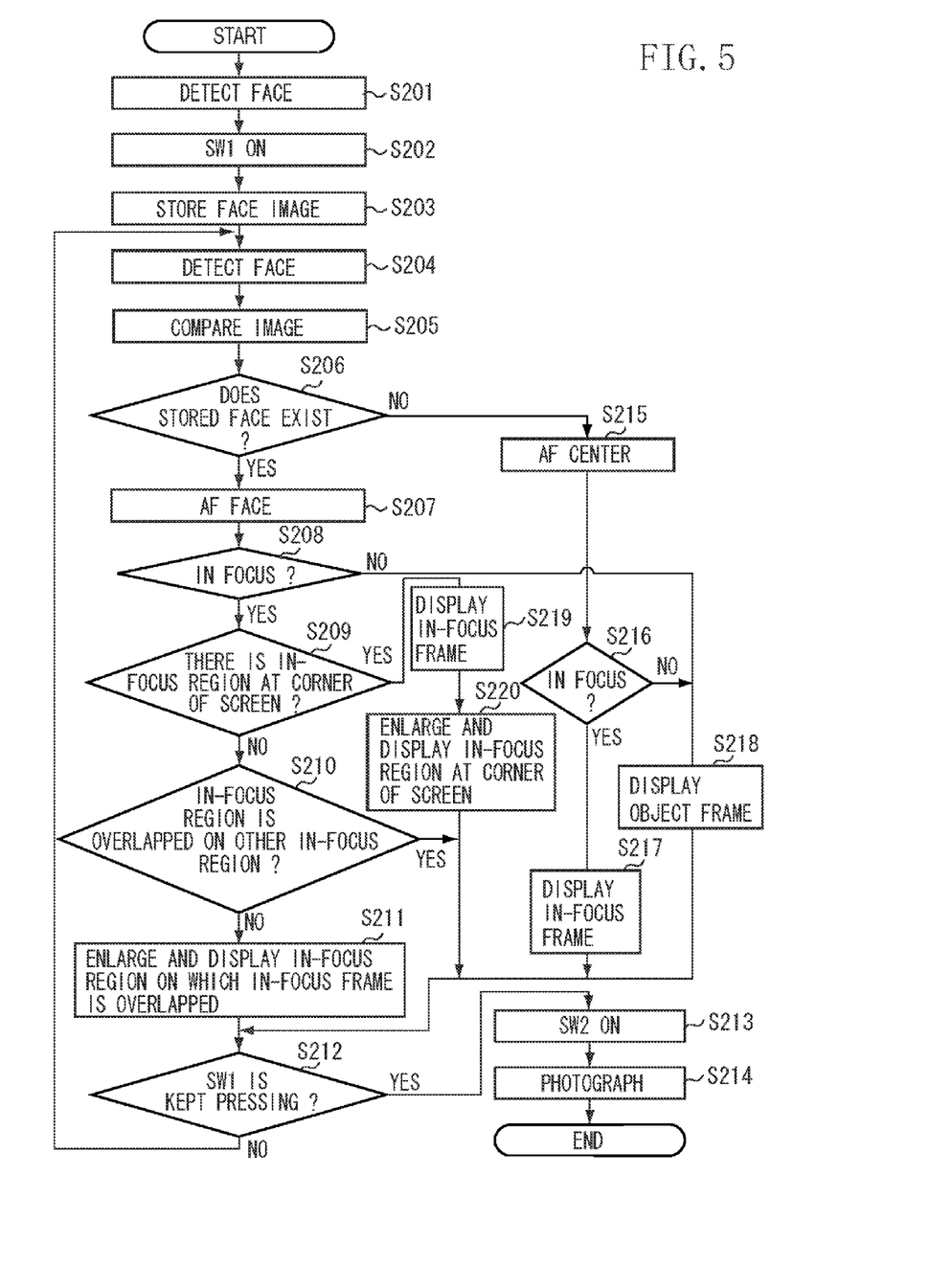
FIG. 5 is a flowchart illustrating main operations according to a second exemplary embodiment.

In FIG. 5, since operations in steps S201, S202, S203, S204, S205, S206, S207, and S208 are the same as those in steps S101, S102, S103, S104, S105, S106, S107, and S108, the descriptions will not be repeated.

In step S209, the system control circuit 50 determines whether the in-focus region automatically focused in step S207 is at a corner of the photographic screen. In a case where, when the in-focus region is enlarged and displayed as described above in step S111 in FIG. 3, the displayed region is not out of the frame of the photographic screen, it is determined that the in-focus region is not at the corner of the photographic screen. When it is determined that the in-focus region is not at the corner of the screen (NO in step S209), the processing proceeds to step S210. When it is determined that the in-focus region is at the corner of the screen (YES in step S209), the processing proceeds to step S219.

When the in-focus region is not at the corner of the screen (NO in step S209), the processing proceeds to step S210. In step S210, the system control circuit 50 determines whether the in-focus region auto-focused in step S207 is overlapped with another in-focus region. The another in-focus region refers to an in-focus region in which a face other than the face to be the main object among the faces detected in step S204 and positioned in the same object depth as that of the face to be the main object is included.

When it is determined that the main object is not overlapped with the another in-focus region (NO in step S210), the processing proceeds to step S211. When it is determined that the main object is overlapped with the another in-focus region (YES in step S210), the processing proceeds to step S219.

Since operations performed in steps in S211, S212, S213, S214, S215, S216, S217, and S218 are the same as those performed in steps S111, S112, S113, S114, S115, S116, S117, and S118 illustrated in FIG. 3 described above, the descriptions will not be repeated. Further, since an operation performed in step S219 is the same as that performed in step S117 illustrated in FIG. 3 described above, the description will not be repeated.

Figure 6A:
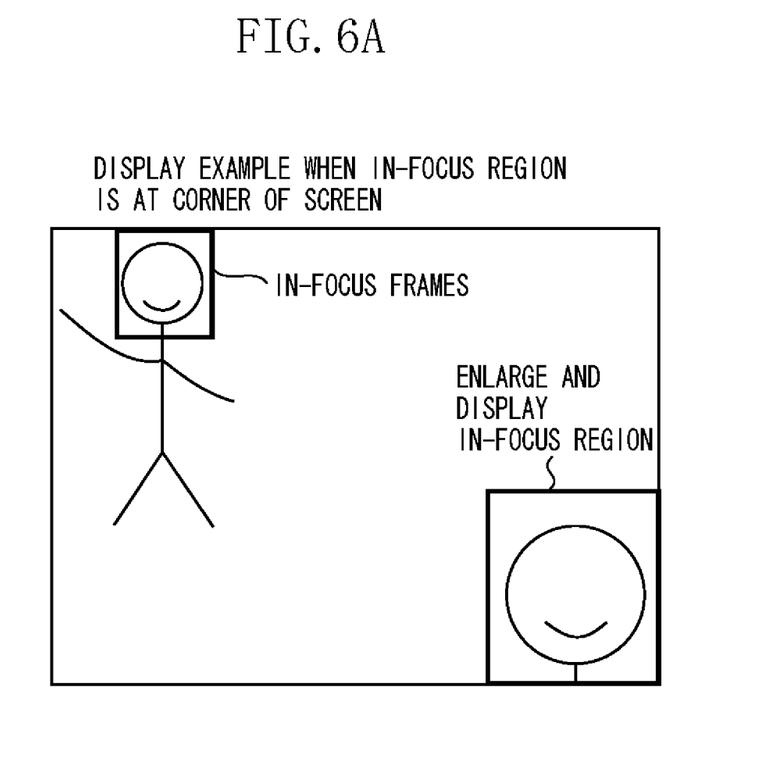
FIG. 6A and FIG. 6B illustrate display examples according to the second exemplary embodiment.

In step S220, only the in-focus region including the face of the main object automatically focused in step S207 is enlarged and displayed at a corner inside the photographic screen as illustrated in FIG. 6A.

According to the second exemplary embodiment, a composition immediately before photographing and whether the object is in focus can be simultaneously checked.

According to the first exemplary embodiment, in step S110 illustrated in FIG. 3, it is determined whether the face stored in step S103 and the camera itself are moving. However, such a determination can change the display form of the in-focus region, even when the face or the camera slightly moves, thereby making the user interface messy to be viewed.

In order to prevent such a case, the determination in step S110 may be determined to be staying still when the face stored in step S103 and the camera itself do not move more than a predetermined amount. When it is determined that the face and the camera have not moved more than the predetermined amount, the processing proceeds to step S111. When it is determined that the face and the camera have moved more than the predetermined amount, the processing proceeds to step S117.

Figure 6B:
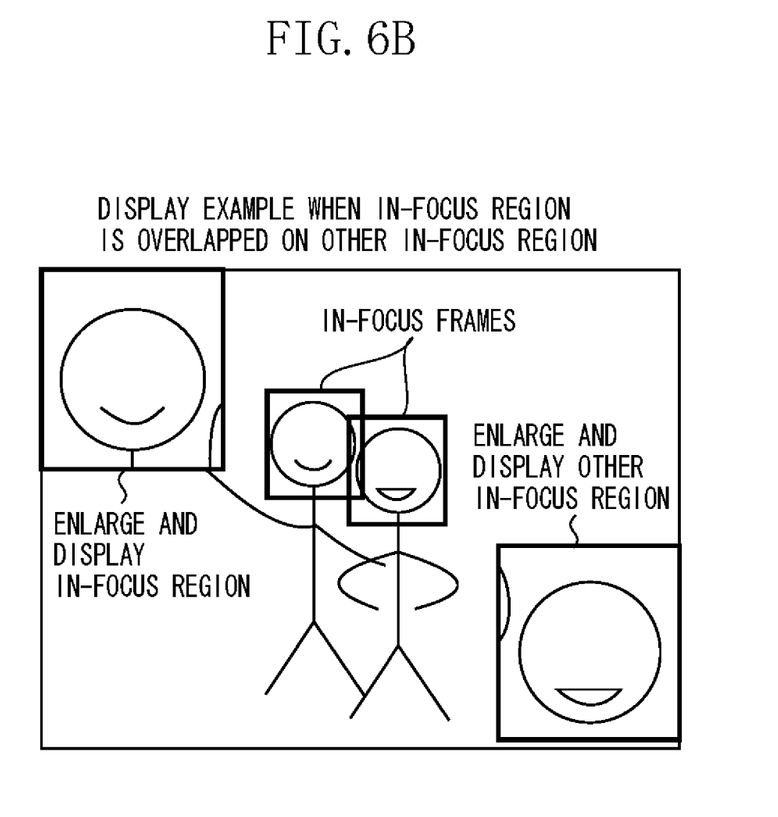

Further, according to the second exemplary embodiment, when the in-focus region of the face of the main object is overlapped with another in-focus region in step S210 in FIG. 5, then in step S219, the in-focus frame is displayed. In step S220, the in-focus region is enlarged and displayed at the corner of the screen (refer to FIG. 6A). However, the processing performed in steps S219 and S220 may be applied to another in-focus region to display thereof as illustrated in FIG. 6B. With this arrangement, a plurality of the in-focus regions can be simultaneously checked.

As described above, according to the first and second exemplary embodiments, the in-focus region of the main object is enlarged and displayed to easily check whether the main object is in focus. Further, the display form is changed according to the movement of the main object, and the size, and the position thereof in the photographic screen to easily check the state of the object.

As an example of changing the display form for enlarging and displaying the in-focus region, the example is described in which the in-focus frame is displayed and the object is enlarged and displayed at the corner in the photographic screen. As other examples of changing the display form, a shape, a color, a thickness and a line type of the display frame may be changed, and the display frame may blink. However, such examples of changing the display form can make the determination easy or difficult depending on the color and the shape of the object.

Further, as described in the examples in which the face of the object is detected, however, as long as specific colors or objects are detected, the present invention can be applied to the objects including animals, plants, and vehicles other than the face. Furthermore, a target for enlarging and displaying the in-focus region does not have to be one object as described in the first and second exemplary embodiments, but the present invention can be also applied to a plurality of objects.

Moreover, according to the present exemplary embodiment, when the movement of the object or the camera is detected, the in-focus region is inhibited to be enlarged and displayed. However, the in-focus region does not need to be inhibited to be enlarged and displayed, but may have a limitation to be enlarged and displayed. In other words, when the movement of the object or the camera is detected, the in-focus region may be enlarged and displayed smaller than when the movement is not detected.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   a display unit configured to display a captured image;
   an object region detection unit configured to detect an object region including an object inside a photographic screen;
   an in-focus determination unit configured to determine whether the object region is in focus;
   an enlarge unit configured to enlarge and display on a display unit the object in the object region in focus;
   a movement detection unit configured to detect whether the object in the object region moves in the photographic screen; and
   a control unit configured to, upon detecting the object is moving, limit the enlarge unit from performing enlargement and display.

2. The apparatus according to claim 1,
   wherein, when the object region is not in focus, the control unit inhibits the enlarge unit from performing the enlargement and display.

3. The apparatus according to claim 1, further comprising a size determination unit configured to determine a size of the object region in the photographic screen,
   wherein, when the size of the object region is larger than a predetermined size, the control unit inhibits the enlarge unit from performing the enlargement and display.

4. The apparatus according to claim 1, further comprising a position determination unit configured to determine a position of the object region in the photographic screen,
   wherein, when a position of the object region is at a corner of the photographic screen, the control unit enables the enlarge unit to perform the enlargement and display at a position different from the object region.

5. The apparatus according to claim 1, further comprising a position determination unit configured to determine a position of the object region in the photographic screen,
   wherein, when a position of the object region is overlapped with a position of another object region, the control unit enlarges and displays the object region and the another object region in each separate position other than the object region and the another object region.

6. The apparatus according to claim 1, wherein, when the object moves in less than a predetermined amount of movement, the movement detection unit detects that the object is not moving.

7. The apparatus according to claim 1, wherein the object enlarged and displayed by the enlarge unit is overlapped at the position of the object in the photographic screen.

8. The apparatus according to claim 1, wherein the movement detection unit compares the captured images so as to detect whether the object in the object region moves in the photographic screen.

9. The apparatus according to claim 1, wherein the enlarge unit enlarges and displays on a display unit the object in the object region in focus lager than the object in the object region which is not in focus.

10. A method comprising:
    detecting an object region including an object inside a photographic screen;
    determining whether the object region is in focus;
    enlarging and displaying on a display unit the object in the object region in focus by an enlarge unit;
    detecting whether the object in the object region is moving in the photographic screen; and
    limiting the enlarge unit, upon detecting the object is moving, from performing enlargement and display.

11. The method according to claim 10, further comprising, when the object region is not in focus, inhibiting the enlarge unit from performing the enlargement and display.

12. The method according to claim 10, further comprising determining a size of the object region in the photographic screen; and
    inhibiting the display unit from performing the enlargement and display, when the size of the object region is larger than a predetermined size.

13. The method according to claim 10, further comprising:
    determining a position of the object region in the photographic screen; and
    enabling the display unit to perform the enlargement and display at a position different from the object region,
    wherein, when a position of the object region is at a corner of the photographic screen.

14. The method according to claim 10, further comprising:
    determining a position of the object region in the photographic screen; and
    enlarging and displaying the object in the object region and the another object in the another object region in each separate position other than the object region and the another object region when a position of the object region is overlapped with a position of another object region.

15. The method according to claim 10, further comprising, when the object moves in less than a predetermined amount of movement, detecting that the object is not moving.

16. The method according to claim 10, wherein the object enlarged and displayed is overlapped at the position of the object in the object region.

17. The method according to claim 10, wherein enlarging and displaying on the display unit the object in the object region in focus lager than the object in the object region which is not in focus.

18. A non-transitory computer readable medium storing a computer-executable program of instructions for causing a computer to perform a method comprising:
    detecting an object region including an object inside a photographic screen;
    determining whether the object region is in focus;
    enlarging and displaying on a display unit the object in the object region in focus by an enlarge unit;
    detecting whether the object in the object region is moving in the photographic screen; and
    limiting the enlarge unit, upon detecting the object is moving, from performing enlargement and display.

19. The non-transitory computer readable medium according to claim 18, further comprising, when the object region is not in focus, inhibiting the enlarge unit from performing the enlargement and display.

20. The non-transitory computer readable medium according to claim 18, further comprising determining a size of the object region in the photographic screen; and
    inhibiting the display unit from performing the enlargement and display, when the size of the object region is larger than a predetermined size.

* * * * *